Patented June 9, 1925.

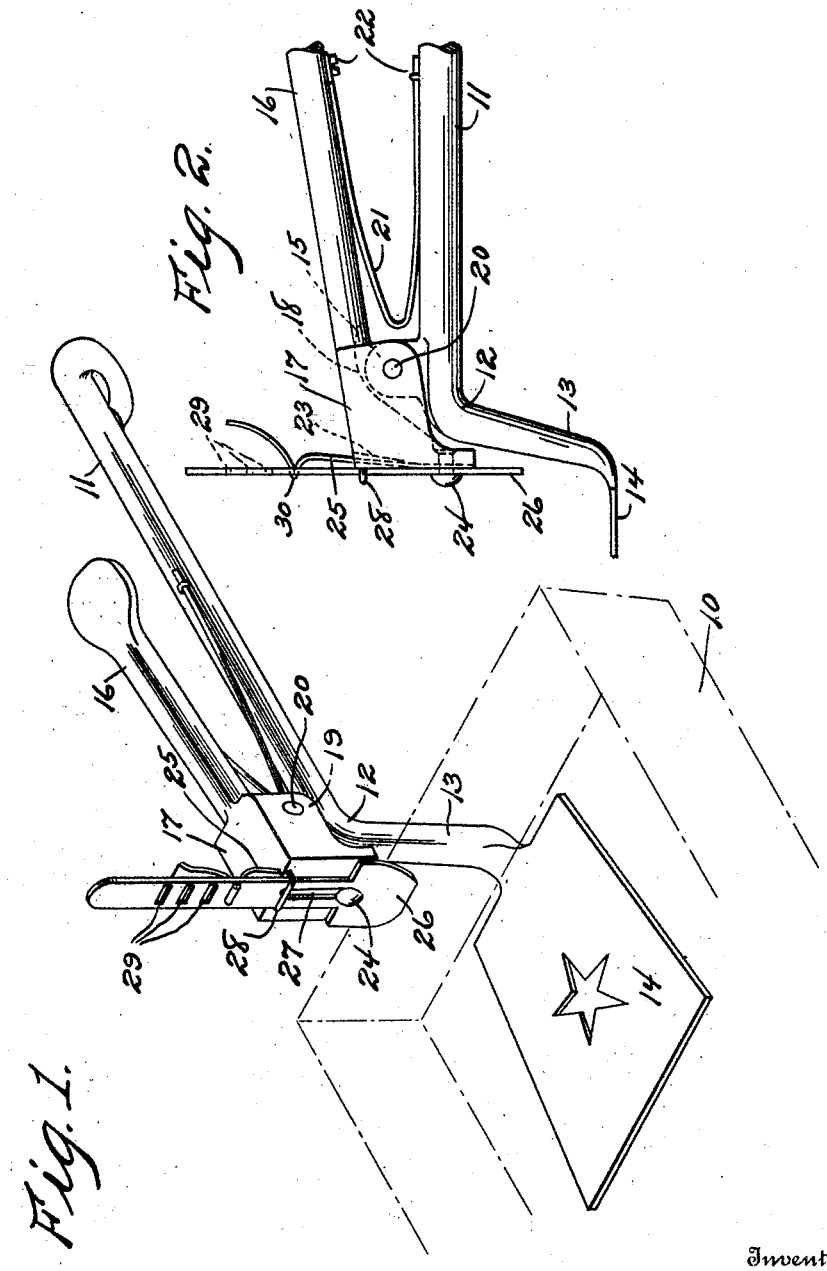

1,541,738

UNITED STATES PATENT OFFICE.

WILLIAM W. PEYTON, OF CARLISLE, ARKANSAS.

LIFTER.

Application filed January 19, 1925. Serial No. 3,459.

*To all whom it may concern:*

Be it known that I, WILLIAM W. PEYTON, a citizen of the United States, residing at Carlisle, in the county of Lonoke and State of Arkansas, have invented new and useful Improvements in Lifters, of which the following is a specification.

This invention relates to improvements in lifters and contemplates the provision of means to be applied to pans and the like whereby the same may be supported or engaged upon the bottom and upper edges thereof and may be firmly grasped or held, thereby preventing the same from tilting and spilling the contents from the pan.

Another object of the invention is the provision of adjustable means upon the upper portion of the device whereby pans of various heights may be accommodated or lifted by this device in order that only one type and size of lifter is needed so that only one type of lifter may be carried in stock by the dealers.

A further object of the invention is the provision of the bottom supporting means which is so shaped or configurate that the same may be used as a shovel, cake turner, or the like, whereby the same may be utilized for several culinary purposes without any change or time spent in effecting the purpose.

With the above and other objects in view, the invention further includes the following novel features and details of construction, to be hereinafter more fully described, illustrated in the accompanying drawing and pointed out in the appended claims.

In the drawing:—

Figure 1 is a perspective of the invention shown applied to a pan.

Figure 2 is a fragmentary side elevation of the invention showing the adjustable means whereby the same may accommodate pans of various heights.

Referring to the drawings in detail, wherein like characters of reference denote corresponding parts, the reference character 10 indicates a pan which is of the usual and well known type and which forms no part of the present application for letters of patent, but is merely shown for purposes of illustration in clearly pointing out the purposes and advantages of the above entitled invention.

In the present invention, I provide a handle member having its forward portion offset as at 12 and has an outwardly and downwardly extending portion 13 protruding therefrom and which terminates in a substantially reduced flat portion 14 which extends in a plane parallel with that of the handle member 11. As clearly illustrated in Figure 1 of the drawing this reduced flat portion 14 is in the form of a shovel and which is adapted to engage or lie flush with the bottom of the pan 10 when it is desirous to lift the same. I have shown in Figure 2 of the drawing that there is an apertured ear or lug 15 which extends from the upper side of the handle member 11 adjacent the offset portion 12 thereof, an upper handle member 16 which carries upon the forward portion thereof a housing 17 which includes a substantially cutout portion 18 and has the opposite sides of the housing member 17 extending over the apertured ear or lug 15 as at 19. The pivot pin 20 extends transversely through the apertured ear or lug 15 and the wall 19 and a corresponding wall, not shown, upon the opposite side thereof whereby the two handle members may be pivotally associated and in order that the same may move relatively. In order to bring the handle members 11 and 16 respectively into their normal positions there is provided a spring member 21 which is interposed between the inner sides of the handle members and is secured to said sides as at 22 whereby the same will be held against accidental displacement thereon. The forward portion of the housing member 17 is inclined as at 23, the purpose of such inclination will be presently apparent. The lower forward portion of the housing 17 has extending therefrom in spaced relation thereto a pin or bolt 24 and which has rigidly secured thereon a spring member 25. Mounted for reciprocation on the pin 24 is a pan engaging element 26 which includes a longitudinally disposed slot 27 which is adapted to receive the inner end portion, not shown, of the pin 24 therethrough whereby the same may freely reciprocate thereon. A substantially U-shaped guide 28 secured to the front or forward portion of the housing member 17 and which receives the upper reduced portion of the pan engaging element whereby the same will be held against lateral or side play movement. The pan engaging element includes the plurality of transversely disposed elongated slots 29 therein and which are adapted to selectively engage an offset portion 30 of the member 25. It will thus be seen that the member 25 may move longitudinally of the handle members 11 and 16 between the inner sides of the pan engaging element 26 and the inclined wall 23 on the forward portion of the housing 17.

It will thus be seen that the member 25 may move longitudinally between the inner wall of the pan engaging element 26 and the beveled wall 23 upon the forward portion of the housing 17 whereby the same may selectively interpose its offset portion 30 in any one of the slots 29 in the upper portion of the pan engaging element 26.

In the use and operation of the present invention it will be clearly apparent that the shovel portion 14 of the handle member 11 may have its upper face lie flush with the bottom of a pan such as shown in 10 of Figure 1 of the drawing and that the downwardly and outwardly extending portion 13 of the handle member 11 may lie against a side edge of the pan and upon moving the pan engaging element downwardly and interposing the offset portion 30 of the member 25 in any one of the elongated slots 29 therein, it will be seen that the pan engaging element 26 may extend to the upper side of the bottom thereof, and firmly engage the pan whereby the same will be held against lateral movement and prevented against slipping thereon. It is also to be understood that the shovel portion 14 may be used as a cake turner or the like or put to any other use to facilitate a culinary advantage.

The invention is susceptible of various changes in its form, proportions and minor details of construction and the right is herein reserved to make such changes as properly fall within the scope of the appended claims.

Having thus described my invention what is claimed is:—

1. A lifter of the character described comprising a pair of pivotally associated handle members, retractile means interposed between the inner sides of the handle members for returning the same to their normal positions, a lower handle member being substantially offset and providing a downwardly and outwardly inclined portion, a substantially flat reduced portion extending from the lower end thereof and in a plane parallel with that of the handle, an upper handle including a housing upon the forward end portion thereof, and having its front wall substantially beveled, a spring finger rigidly secured to the front of the housing and spaced from the beveled wall, and reciprocating adjustable means positioned on the front of the housing for selective engagement for the purpose set forth.

2. A lifter of the character described comprising a pair of pivotally associated handle members, retractile means interposed between the inner sides of the handles for returning the same to their normal positions, a lower handle being substantially offset and providing a downwardly and outwardly inclined portion, a substantially flat supporting member extending from the lower end portion thereof and in a plane parallel with that of the handle, an upper handle having a housing upon the forward end portion thereof and having its front wall substantially beveled, a substantially offset spring member rigidly secured to the front beveled wall of the housing, a vertically disposed longitudinally slotted engaging member mounted for reciprocation upon the forward beveled wall of the housing and having a plurality of substantially elongated slots therein which are adapted to selectively engage the offset portion of the spring member.

In testimony whereof I affix my signature.

WILLIAM W. PEYTON.